Patented Aug. 18, 1942

2,293,649

UNITED STATES PATENT OFFICE 2,293,649

PREPARATION OF HIGH MOLECULAR WEIGHT BRANCHED CHAIN ACIDS

Benjamin W. Howk, Wilmington, Del., assignor to E. I. du Pont de Nemours & Company, Wilmington, Del., a corporation of Delaware No Drawing. Application July 15, 1941, Serial No. 402,545

7 Claims. (Cl. 260—413)

This invention relates to new chemical compounds and more particularly to high molecular weight branched chain aliphatic acids.

Large quantities of high molecular weight aliphatic acids and their derivatives are consumed annually by the chemical and related industries in such applications as paste and emulsion polishes, artificial leather finishes, textile waterproofing agents and finishes, coating of paper, and in the modification of natural and synthetic rubbers. Generally speaking, these materials are obtained from a rather limited group of natural products, many of which are imported at premium prices. For example, carnauba wax, which is obtained from South America, contains as its principal ingredient a wax ester of cerotic acid. Similar acids in this range are present in beeswax and in candelilla wax, which is obtained from a variety of cactus indigenous to southwestern United States and Mexico. Along similar lines montan wax, derived from a German brown coal, contains montanic acids, which have 28—29 carbon atoms. Other acids in the range of 24—30 carbon atoms are available in limited amounts from certain hydrogenated fish oils. However, it should be emphasized that in common with many other products from natural sources, these waxes and the corresponding high molecular weight acids are subject to many uncertainties as regards supply and cost, especially in times of economic stress.

On the other hand, no practical synthetic processes for producing high molecular weight aliphatic acids and the many valuable articles of commerce derived from them are known. The method heretofore proposed have not been successful because of one or more disadvantages such as low yield, high cost of operation, and complicated multiple step procedures attended by high material losses. The present invention provides a practical process for obtaining high molecular weight branched chain acids, which in many cases can be used to advantage to replace acids from natural sources.

This invention has as an object a new and improved method for obtaining high molecular weight branched chain aliphatic carboxylic acids containing at least 24 carbon atoms from primary aliphatic monohydric alcohols containing at least 12 carbon atoms and at least one hydrogen on the carbon alpha to the carbinol group. Other objects will appear hereinafter.

These objects are accomplished in the manner more fully pointed out hereinafter by heating primary aliphatic alcohols containing 12 or more carbon atoms and at least one hydrogen atom on the carbon atom alpha to the carbinol group with a small amount of an alkali metal.

In the preferred method of practicing this invention an aliphatic monohydric alcohol containing 12 or more carbon atoms and at least one hydrogen on the carbon alpha to the carbinol group is charged into a reaction vessel equipped with a device for measuring temperature, an air cooled reflux condenser attached to a gas outlet tube, and an efficient agitator. The alcohol is stirred rapidly and heated to between 100° and 160° C. and generally at approximately 110° C. An amount of alkali metal, such as sodium, corresponding to 0.5 to 0.65 atom per mole of alcohol used is then added portionwise to the alcohol over an interval ranging from about 30 minutes to about one hour, depending on the scale of operation and the speed with which the reaction occurs. After all the alkali metal has been added, the temperature of the reaction mixture is gradually increased with stirring to between 160° C. and 230° C. and usually between 160° and 200° C. where it is maintained until the alkali metal has completely dissolved, as evidenced by cessation of hydrogen evolution. The temperature of the reaction mixture is thereafter gradually increased until a maximum value in the neighborhood of 285° to 290° C. is reached, the temperature being regulated as to maintain the reaction mixture in the fluid state at all times. The reaction is continued under these conditions until complete, as indicated by a rapid decline in the rate of gas evolution. Heating under substantially atmospheric pressure is preferably continued for an additional half hour. In general, the time required for conducting the entire reaction is approximately 4 to 6 hours.

The resulting product is a viscous high melting soap which congeals to a hard waxy solid on cooling. The solid soap is transferred to 5 to 10 times its volume of hot water, which is stirred vigorously at or near the boiling point until the soap has completely dissolved. While the solution is still hot a slight molecular excess of a mineral acid, such as hydrochloric or sulfuric acids, is added to liberate the resulting high molecular weight branched chain aliphatic acid. The acid may separate either as a solid or liquid depending on the nature of the particular acid. The high molecular weight acid is preferably isolated by cooling the aqueous mixture and separating while cold. The amount of crude branched chain acid obtained is approximately equal to the weight of the alcohol employed as starting material, and it may conveniently be purified by crystallization from appropriate solvents or by any other method known to the art. The yields of purified acid vary from about 50% to approximately 90% of theory depending upon the amount of alkali metal employed in the initial condensation reaction.

The invention is further illustrated by the following examples in which the reactants are given in terms of parts by weight unless otherwise indicated.

Example I

Two hundred seventy parts of commercial grade octadecyl alcohol is charged into a reaction vessel equipped with an efficient anchor type stirrer, an air-cooled reflux condenser attached to a gas outlet tube, and a thermometer. The mixture is heated to between 100° and 160° C. with stirring, while adding 11.5 parts of metallic sodium portionwise over a period of about 30 minutes. The stirred reaction mixture is heated in the range of 160° to 170° C. until the cessation of hydrogen evolution indicates that all the sodium has reacted completely. Thereafter, the temperature is gradually increased to 230° C., at which temperature the evolution of gas, consisting principally of hydrogen, begins at a rapid rate. This is accompanied by a steady increase in the viscosity of the reaction mixture, and the temperature is gradually raised to a value in the neighborhood of 285° C. over a period of 2 to 3 hours. On heating for an additional 1 to 2 hours the evolution of gas is complete, and the product is cooled and taken up in 5 to 6 volumes of boiling hot water. Careful acidification of the resulting translucent soapy solution with a slight excess of concentrated hydrochloric acid liberates a faintly yellow oil, which solidifies on cooling to a hard low-melting wax. The yield of crude solid is 266 parts. The neutral equivalent of this material is 566, and fractional crystallization from a mixture of acetone and technical ethyl acetate gives 161 parts of a white crystalline acid, melting point 56° to 58° C., 36.7 parts of a neutral waxy product, melting point 52° to 59° C., and 32 parts of stearic acid, melting point 70° C. The main product is identified as hexadecyl-2-ecosanoic acid by the following analytical values: Calcd. for $C_{36}H_{72}O_2$; C, 80.6; H, 13.4; neutral equivalent 536; M. W., 536. Found: C, 80.2; H, 13.3; neutral equivalent 532; M. W., 547.

Example II

Two hundred and seventy parts of commercial octadecyl alcohol is charged into a reaction vessel equipped with a stirrer, reflux condenser, and thermometer. The mixture is heated to between 110° and 125° C. with stirring while adding 13.8 parts (0.6 atom) of metallic sodium over a period of about 30 minutes. The stirred mixture is heated rapidly to about 200° C. and maintained at this temperature until all the sodium has dissolved. The temperature of the reaction mixture is then raised to about 280° C., at which temperature evolution of gas, consisting principally of hydrogen, is rapid and continues for about 2 hours. The reaction mixture is maintained at 280° C. for a half hour longer, then permitted to cool to room temperature, transferred to 10 volumes of boiling water, and heated with stirring until the sodium salts are completely disintegrated to form a somewhat viscous, transparent filmy, solution. The solution is carefully acidified with a slight molecular excess of concentrated hydrochloric acid to liberate a nearly colorless oil which on cooling solidifies to a hard, white wax similar to the product of Example I. The yield of crude product is 217 parts. This material is found to be completely soluble in acetone, except for a small amount of yellow oily product which solidifies to a soft wax on cooling to 40° C. This is separated by decanting the main solution, which on cooling to ice temperatures deposits 222 parts of a high molecular weight acid in fine crystals. The neutral equivalent of the product is 527 and is found to be identical with hexadecyl-2-eicosanoic acid. The yield of the crystalline product is 84 to 85% of theory. Twenty one and eight tenths parts of stearic acid is also isolated from the acetone filtrate.

In the practice of this invention any alkali metal, such as lithium, sodium, potassium, rubidium, and cesium can be used. These can be employed singly or in various alloy combinations, provided the alkali metal-alcohol molecular ratio is maintained within appropriate limits. From a commercial point of view, it is particularly convenient and economical to employ metallic sodium. For maximum yields of branched chain acids, it is preferred to use 0.5 to 0.65 atom of alkali metal per mole of alcohol, although in some cases still higher proportions may be desirable.

The alcohols used can be straight or branched chain aliphatic alcohols or they can contain other substituent groups such as aryl at positions removed from the carbinol group by at least 2 carbon atoms. Typical examples of these alcohols are dodecanol-1, tetradecanol-1, hexadecanol-1, octadecanol-1, eicosanol-1, ethyl-4-dodecanol-1, phenyl-10-octadecanol-1, hexyl-2-decanol-1, ceryl alcohol, and a wide variety of other straight and branched chain alcohols.

The process of this invention provides a convenient and practical low cost method for the production of a wide variety of high molecular weight branched chain acids dodecyl-2-tetradecanoic, dodecyl-2-hexadecanoic, tetradecyl-2-octadecanoic, octadecyl - 2 - tetracosanoic, etc. These acids are produced by a simple 1-step process from relatively inexpensive available materials. The high molecular weight branched chain acids and their derivatives are useful in the formulation of paste polishes, emulsion polishes, moistureproofing compositions for transparent wrapping film, textile waterproofing agents, surface active reagents and a host of other uses.

As many apparently widely different embodiments of this invention may be made without departing from the spirit and scope thereof, it is to be understood that I do not limit myself to the specific embodiments thereof except as defined in the appended claims.

I claim:

1. In a process for making branched chain aliphatic acids containing at least 24 carbon atoms from primary aliphatic alcohols containing at least 12 carbon atoms and at least one hydrogen atom on the carbon atom alpha to the carbinol group, the step which comprises heating said alcohol with a small amount of an alkali metal.

2. In a process for making branched chain aliphatic acids containing at least 24 carbon atoms from primary aliphatic alcohols containing at least 12 carbon atoms and at least one hydrogen atom on the carbon atom alpha to the carbinol group, the steps which comprise adding a small amount of an alkali metal to the alcohol heated at a temperature from about 100° C. to about 200° C., thereafter heating the mixture up to 290° C., and maintaining the temperature at that point until gas evolution substantially ceases.

3. In a process for making branched chain aliphatic acids containing at least 24 carbon atoms from primary aliphatic alcohols containing at least 12 carbon atoms and at least one hydrogen atom on the carbon atom alpha to the carbinol group, the steps which comprise initially heating said alcohol from 100° C. to 160° C., adding from 0.5 to 0.65 atom of an alkali metal per mole of alcohol, continuing the heating at a higher temperature of from 160° to 230° C., and then continuing the heating at a still higher temperature of from 230° to 290° C.

4. A process for making branched chain aliphatic acids containing at least 24 carbon atoms from primary aliphatic monohydric alcohols containing at least 12 carbon atoms and at least one hydrogen atom on the carbon atom alpha to the carbinol group, said process comprising heating said alcohol at a temperature from about 100° to 290° C., adding thereto from about 0.5 to 0.65 atom of an alkali metal per mole of alcohol, continuing the heating after all the alkali metal has been added until gas evolution ceases, cooling the reaction mass, and then treating the resulting product with a mineral acid to liberate said branched chain acid.

5. A process for making branched chain aliphatic acids containing at least 24 carbon atoms from primary aliphatic monohydric alcohols containing at least 12 carbon atoms and at least one hydrogen atom on the carbon atom alpha to the carbinol group, said process comprising heating said alcohol to a temperature of from 100° to 160° C., adding portionwise thereto from 0.5 to 0.65 atom of an alkali metal per mole of alcohol, increasing the temperature of the reaction mixture to between 160° and 200° C., maintaining said last mentioned temperature until the metal has dissolved, increasing the temperature within the range of 275° to 290° C. until the reaction is complete, and then treating the resulting product with a mineral acid to liberate said branched chain acid.

6. Hexadecyl-2-eicosanoic acid.

7. The process set forth in claim 2 in which said metal is sodium.

BENJAMIN W. HOWK.